Patented Apr. 6, 1948

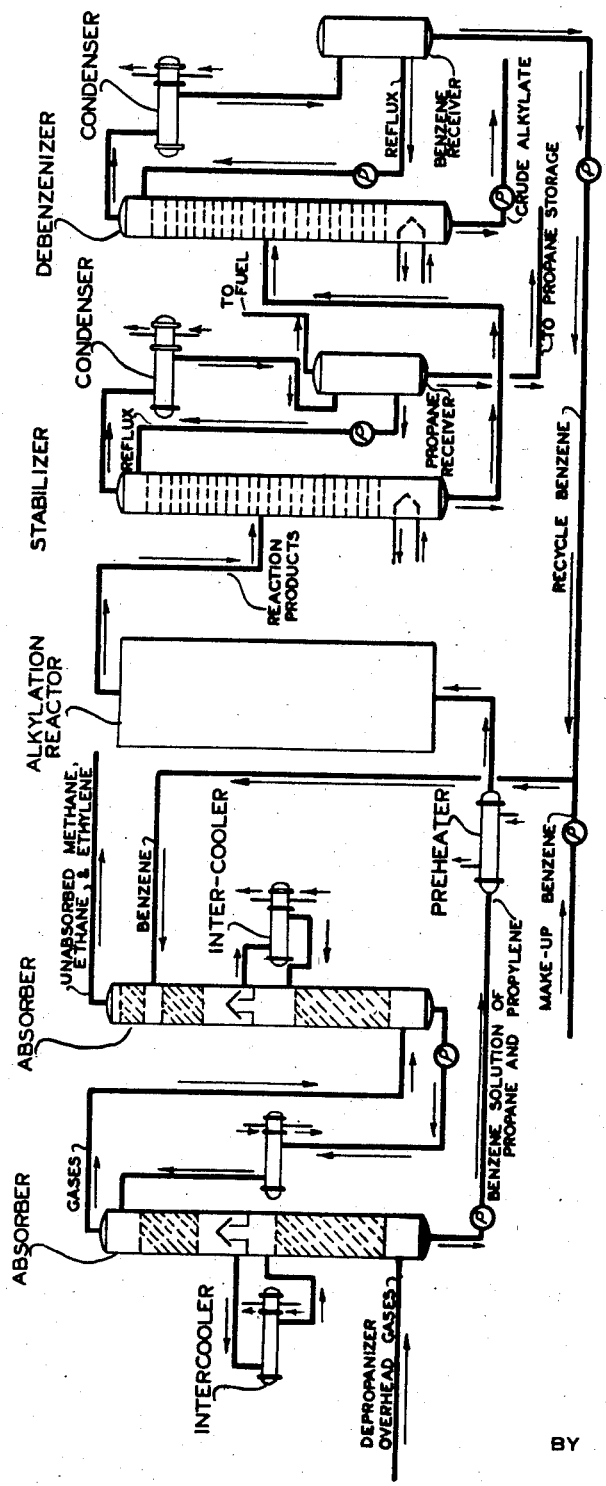

2,439,080

UNITED STATES PATENT OFFICE 2,439,080

PROCESS FOR UTILIZING GAS MIXTURES IN THE ALKYLATION OF AROMATIC HYDROCARBONS

James A. Davies, Scarsdale, N. Y., assignor to The Texas Company, New York, N. Y., a corporation of Delaware Application May 11, 1943, Serial No. 486,534

12 Claims. (Cl. 260—671)

My invention relates to the utilization of olefin-containing gas mixtures for the alkylation of aromatic hydrocarbons, and especially to the utilization of petroleum refinery cracked gases for the production of cumene and other alkyl benzenes.

It is known that benzene and other aromatic hydrocarbons may be successfully alkylated by normally gaseous olefins in the presence of catalysts such as sulfuric acid, phosphoric acid, hydrofluoric acid, aluminum chloride, and the like. The use of pure olefins for this purpose is undesirable in view of the expense of separating the olefins from the usual commercial sources of these hydrocarbons, such as petroleum refinery cracked gases. The direct use of such gas mixtures for alkylation, on the other hand, is also undesirable in view of the mixed alkylation products produced and the operating difficulties which are encountered. For example, in alkylating benzene with a mixture of hydrocarbons of less than 4 carbon atoms, such as a depropanizer overhead fraction, mixed ethyl and isopropyl benzenes will be produced and the reaction mixture will contain sufficient hydrocarbons of less than 3 carbon atoms to require excessive pressures in stabilizing the alkylate.

I have now discovered that adequate separation of gas mixtures such as refinery cracked gases, to obtain fractions suitable for use in the alkylation of an aromatic hydrocarbon, may be effected by selective absorption in the aromatic hydrocarbon to be alkylated. I have found that all of the olefin for the alkylation may be absorbed in this manner without resulting in increased polymerization side reactions, and that the reaction products thus secured may be stabilized at practical distillation pressures. My process also results in high yields of mono-alkylated aromatic hydrocarbons, and it is possible by this method to obtain a product comprising at least 75% by volume of a single alkyl benzene.

In accordance with my process, the gas mixture is subjected to contact with the liquid aromatic hydrocarbon at superatmospheric pressure, and the temperature, pressure, and liquid to gas ratio are correlated to effect selective absorption of the higher molecular weight constituents, leaving the major proportion of the lower molecular weight constituents in the gas phase. The ratio of aromatic hydrocarbon to gas is suitably chosen on the basis of the ratio of aromatic hydrocarbon to olefin desired in the alkylation reaction, and the absorption temperature and pressure are then adjusted to effect the desired separation.

Thus, when employing benzene in a mol ratio of 5 to 1, based on the olefin content of a gas mixture containing only hydrocarbons of less than 4 carbon atoms, substantially all of the propane and propylene may be absorbed at temperatures of 100 to 300° F. and pressures of 100 to 400 pounds per square inch. Under these conditions, very little of the methan content of the mixture will be absorbed, and only relatively small amounts of the ethane and ethylene. When employing gas mixtures containing butanes and butylenes, in addition to lower molecular weight hydrocarbons, lower absorption pressures or higher absorption temperatures, or both, may be employed to effect substantially complete absorption of the $C_4$ hydrocarbons, and only partial absorption of the lower molecular weight hydrocarbons.

The conditions for selective absorption may thus be varied over a considerable range, for example, temperatures of 50 to 550° F. and pressures of 50 to 1000 pounds per square inch. When absorbing $C_3$ hydrocarbons from mixtures such as depropanizer overhead fractions, I prefer to effect the absorption at temperatures of 100 to 300° F. and pressures of 100 to 400 pounds per square inch. Within these ranges, combinations of low pressures and low temperatures, or high pressures and high temperatures, which will provide selective absorption of the higher molecular weight gases may easily be selected by those skilled in the art.

Any suitable absorption equipment may be used, such as packed columns or towers equipped with bubble-cap trays. In view of the substantial heat of absorption, absorbers for use at relatively low pressures are preferably equipped with cooling means, such as intercoolers between sections of a single absorption tower or between absorption towers in series. On the other hand, absorbers operating at very high pressures are preferably equipped with similar heat exchangers adapted to serve as heaters to maintain the absorption temperature sufficiently high to prevent complete absorption of the lower molecular weight gases. Any of the usual expedients for obtaining efficient gas absorption may be applied to the absorption step in my present process.

The alkylation of the solution obtained in the absorption step may be effected in accordance with usual practices, and common expedients such as a high ratio of aromatic hydrocarbon to olefin are suitably employed to obtain maximum alkylate yields. I prefer to maintain a ratio of aromatic hydrocarbon to olefin in the reaction mixture of at least 3 to 1, and preferably 5 to 1, or higher. Any of the known alkylation catalysts may be used, but I prefer to employ solid catalysts such as the so-called "solid phosphoric acid catalysts," i. e., phosphoric acid adsorbed on a support such as kieselguhr. The usual precautions should be taken to maintain the catalyst in an active state, such as the provision of moisture in the reaction mixture to maintain a phosphoric acid catalyst in hydrated condition.

The reaction temperature may be chosen in accordance with the particular catalyst employed; thus, for most kieselguhr-phosphoric acid catalysts, the temperature is suitably 400 to 550° F., and preferably 450 to 500° F. The reaction pressure may be substantially the same as the absorption pressure or may be considerably higher or lower than such pressure, but should be sufficiently high to maintain substantially liquid phase conditions during the alkylation. Pressures of the order of 600 pounds per square inch have been found to be very satisfactory and may suitably be used, irrespective of the absorption pressure.

My process is applicable to the alkylation of any of the normally liquid aromatic hydrocarbons, i. e., the aromatic hydrocarbons which are liquids at efficient absorption temperatures. I prefer to use mono-cyclic aromatic hydrocarbons, and especially benzene. If the alkylation product is to be employed in motor fuels, it is desirable that the aromatic hydrocarbon employed have a low content of sulfur compounds. However, satisfactory alkylates for motor fuel purposes may be produced from ordinary commercial grades of benzene.

My process is satisfactory for the utilization of the olefins in any gas mixture containing substantial amounts of normally gaseous olefins, but is especially useful for the utilization of petroleum refinery gas mixtures, such as cracked gases. For the production of alkylates for use in motor fuels, the gas mixture as well as the aromatic hydrocarbon should be low in sulfur compounds. The mercaptans may be removed from the light gases by conventional methods such as caustic washing, and residual hydrogen sulfide may then be removed by conventional treatments such as the use of soda ash or tri-potassium phosphate.

My process is especially useful in the utilization of $C_3$ and lighter hydrocarbon fractions for the alkylation of benzene to produce primarily cumene, and my invention will be further illustrated with particular reference to this process. One modification of a procedure involving the absorption in benzene of predominantly $C_3$ hydrocarbons from a $C_3$ and lighter fraction, and alkylation of the resulting solution, is illustrated diagrammatically in the accompanying drawing. As may be seen in this drawing the gas mixture, comprising a substantially sulfur-free depropanizer overhead fraction, passes through two absorbers in series countercurrent to benzene. These absorbers are suitably dual-section packed columns equipped with intercoolers between each section and between the two columns. The absorbers may be operated at a pressure of somewhat less than that of the depropanizer column from which the gas mixture is obtained, e. g., 300 pounds per square inch. The ratio of benzene to gas in the absorbers is suitably maintained at about 5 mols of benzene per mol of olefin in the gas mixture, and the temperature in the absorbers is then controlled by means of the intercoolers to obtain substantially complete absorption of the $C_3$ hydrocarbons and only partial absorption of the lighter hydrocarbons. With an efficient absorber and an absorption pressure of about 200 pounds per square inch, the temperature may suitably be 100 to 200° F.

The benzene solution from the absorber is passed through a preheater to the alkylation reaction chamber, which is suitably filled with a kieselguhr-phosphoric acid catalyst. The alkylation with this type of catalyst may suitably be effected at 450 to 500° F. and at a pressure of the order of 600 pounds per square inch. The product leaving the alkylation reaction chamber then passes directly to the stabilizing column. When effecting the absorption under the approximate conditions described above, the stabilizer may be operated at a pressure substantially below the alkylation pressure with complete condensation of the overhead fraction for reflux purposes, at ordinary cooling water temperatures in the condenser.

The stabilized product then passes to a debenzenizing column in which the unreacted benzene is taken overhead and the total alkylate is obtained as the bottoms fraction. The latter may then be further fractionated to obtain a light alkylate fraction comprising essentially ethyl benzene, a cumene fraction constituting the bulk of the alkylate, and a heavy fraction comprising higher alkylated benzenes. The cumene fraction obtained in this manner is suitable for use in aviation fuels, and the higher boiling alkylate may be used in automotive fuel mixtures.

My invention will be further illustrated by the following specific examples:

Example I

Benzene is to be alkylated by the propylene component of a gas mixture of the following approximate composition:

| Constituent | Percent of Gas Volume |
|---|---|
| Methane | 11.3 |
| Ethylene | 1.2 |
| Ethane | 31.4 |
| Propylene | 17.7 |
| Propane | 37.7 |
| $C_4$+ | 0.7 |

This gas mixture is passed at a rate of about 52,100 cu. ft. per hour through an absorber having multiple sections packed with Raschig rings, the total absorber having an efficiency of about five theoretical plates. Benzene is charged to the absorber, countercurrent to the gas, at a rate of about 37 barrels per hour (all values for both liquids and gases given herein are referred to 60° F. and 760 mm.). The absorption pressure is maintained at 200 pounds per square inch, absolute, and the temperature is maintained at about 100° F. by means of intercoolers between the sections of the absorber. The $C_3$ and heavier constituents of the gas mixture are absorbed to the extent of at least 97%, together with a small amount of the ethylene and ethane, and very little of the methane. The overhead gas from the absorber contains over 90% by volume of ethane, ethylene, and methane, and less than 10% by volume of propane and propylene.

The benzene solution from the absorbers is charged at a rate of about 62.3 barrels per hour through a preheater to a reaction chamber containing a catalyst comprising approximately 60% by weight of phosphoric acid on kieselguhr. The pressure is maintained at about 600 pounds per square inch, and the temperature at about 480° F., the gradient being approximately 464° F. at entrance, 515° F. at center of catalyst bed, and 469° F. at exit. The reactor space velocity is about 24 barrels per hour per ton of catalyst, or about 0.58 barrel per hour per cubic foot of total reactor volume (measured with no catalyst in the reactor). The resulting contact time is about 11 minutes.

The reaction products pass to a stabilizing column where materials lighter than benzene are taken overhead at a pressure of about 270 pounds per square inch, absolute, with a temperature of about 100° F. in the receiver. Under these conditions a sufficient proportion of the overhead fraction is liquefied to provide adequate reflux, and the net overhead is removed as gas from the receiver vent at the rate of about 32,100 cu. ft. per hour. This gas mixture comprises about 60% by volume of propane, the balance being predominantly ethane with substantially no ethylene and about 2.8% by volume of unreacted propylene.

The stabilized product is then further distilled in a debenzenizing column. The overhead fraction, consisting of about 31.3 barrels per hour of recovered benzene, is recycled to the absorbers, together with about 5.7 barrels per hour of fresh benzene.

The debenzenized product is then further fractionated to obtain a light alkylate fraction comprising largely ethylbenzene, a cumene fraction suitable for aviation fuel blends, and a heavy alkylate fraction comprising predominantly di-isopropylbenzene with smaller amounts of higher molecular weight alkylated benzenes. The yields of these fractions are as follows:

| | Gal. per hr. |
|---|---|
| Light alkylate | 11.7 |
| Aviation cumene | 307.9 |
| Heavy alkylate | 28.9 |

These yields amount to about 218% of cumene, based on the weight of propylene charged, and about 236% of total alkylate, based on the weight of total olefins charged. The conversion of propylene to cumene is about 76.1%, and to total alkylate 87.3%. The conversion of benzene to cumene is about 81.9%, and to total alkylate, about 90.8%.

*Example II*

A gas mixture comprising depropanizer overhead from the stabilization of cracked naphtha is used as the source of propylene for the alkylation of benzene. The gas is caustic washed and salt treated to remove mercaptans and hydrogen sulfide, and the resulting mixture, which is substantially completely free from sulfur compounds, has approximately the following composition:

| Constituent | Per cent of Gas Volume |
|---|---|
| Methane | 0.50 |
| Ethylene | 1.18 |
| Ethane | 10.07 |
| Propylene | 25.00 |
| Propane | 61.75 |
| C$_4$+ | 1.50 |

This gas mixture is passed at a rate of about 47,000 cu. ft. per hour through a multi-section packed column absorber, the total absorber having an efficiency roughly equivalent to three theoretical plates. Benzene is charged to the absorber, countercurrent to the gas, at a rate of about 41 barrels per hour. The absorption pressure is maintained at 200 pounds per square inch, absolute, and a temperature gradient of 100 to 160° F. is maintained by means of intercoolers between the sections of the absorber. The C$_3$ and heavier constituents are absorbed to the extent of 91.5% of the total in the charge, together with small amounts of ethylene and ethane, and very little methane.

The benzene solution from the absorber is charged at a rate of about 67.2 barrels per hour through a preheater to a reaction chamber containing a catalyst comprising approximately 60% by weight of phosphoric acid on kieselguhr. The pressure is maintained at about 600 pounds per square inch, and the temperature at about 480° F., the gradient being approximately 458° F. at entrance, 521° F. at center of catalyst bed, and 464° F. at exit. The reactor space velocity is about 22 barrels per hour per ton of catalyst, or about 0.53 barrel per hour per cubic foot of total reactor volume (measured with no catalyst in the reactor). The resulting contact time is about 12 minutes.

The reaction products pass to a stabilizing column where materials lighter than benzene are taken overhead at a pressure of about 220 pounds per square inch, absolute, with a temperature of about 100° F. in the receiver. The net overhead, which is taken from the receiver at the rate of approximately 19.8 barrels per hour, is a liquefied gas mixture comprising about 38% by volume of propane, the balance being predominantly ethane, with substantially no ethylene, and about 1.6% by volume of unreacted propylene.

The stabilized product is then further distilled in a debenzenizing column. The overhead fraction, consisting of about 34.5 barrels per hour of recovered benzene, is recycled to the absorbers, together with about 6.5 barrels per hour of fresh benzene.

The debenzenized product is then further fractionated to obtain a light alkylate fraction comprising largely ethylbenzene, a cumene fraction suitable for aviation fuel blends, and a heavy alkylate fraction comprising predominantly di-isopropylbenzene with smaller amounts of higher molecular weight alkylated benzenes. The yields of these fractions are about as follows:

| | Gal. per hr. |
|---|---|
| Light alkylate | 8.6 |
| Aviation cumene | 401.1 |
| Heavy alkylate | 34.1 |

These yields amount to 215% of cumene, based on the weight of propylene charged, and about 232% of total alkylate, based on the weight of total olefins charged. The conversion of propylene to cumene is about 75.3%, and to total alkylate 85.5%.

The above examples are merely illustrative and are not to be construed as limiting the scope of my invention. As has previously been pointed out, my invention is applicable to the alkylation of aromatic hydrocarbons other than benzene, and to the utilization of any gas mixtures containing substantial amounts of normally gaseous olefins. Other types of absorption equipment may be substituted for the particular type referred to in the examples, and the alkylation may be effected with different catalysts and under different conditions from those specified in

I claim:

1. In a process for the alkylation of a normally liquid aromatic hydrocarbon by means of a normally gaseous olefin contained in a mixture of normally gaseous hydrocarbons having olefins of different numbers of carbon atoms per molecule, the steps which comprise subjecting said gas mixture to contact with a liquid absorption medium consisting essentially of said liquid aromatic hydrocarbon in a ratio of at least 3 mols of aromatic hydrocarbon per mol of olefin in said gas mixture, under a superatmospheric pressure of at least 50 pounds per square inch and at a temperature such that a large part of the olefin of a higher number of carbon atoms per molecule is selectively absorbed with only partial and considerably smaller absorption of olefin of a lesser number of carbon atoms per molecule, separating the resulting solution from unabsorbed normally gaseous hydrocarbons containing a substantial proportion of the olefin of a lesser number of carbon atoms per molecule, and subjecting the resulting solution to contact with an alkylation catalyst under alkylation conditions.

2. In a process for the alkylation of benzene by means of the olefins in a cracked petroleum gas fraction comprising essentially hydrocarbons of less than 4 carbon atoms, the steps which comprise subjecting said gas mixture to contact with at least 5 mols of benzene per mol of olefin in said mixture, at a temperature of 100 to 300° F. and a pressure of 100 to 400 pounds per square inch, said temperature and pressure being such that substantially all of the propane and propylene are absorbed and only partial absorption of methane, ethane, and ethylene is effected, separating the resulting solution from unabsorbed hydrocarbons of said cracked petroleum gas fraction, and subjecting the resulting solution to contact with an alkylation catalyst under alkylation conditions.

3. In a process for the alkylation of benzene by means of the olefins in the cracked petroleum gas fraction comprising essentially less than 4 carbon atoms, the steps which comprise subjecting said gas mixture to contact with at least 5 mols of benzene per mol of olefin in said mixture at a temperature of 100 to 300° F. and a pressure of 100 to 400 pounds per square inch, said temperature and pressure being such that substantially all of the propane and propylene are absorbed and only partial absorption of methane, ethane, and ethylene is effected, separating the resulting solution from unabsorbed hydrocarbons of said cracked petroleum gas fraction, and subjecting the resulting solution to contact with a solid phosphoric acid alkylation catalyst at a temperature of 400 to 550° F.

4. In a process for the production of cumene from benzene and the propylene component of a cracked petroleum gas fraction comprising essentially hydrocarbons of less than 4 carbon atoms, the steps which comprise subjecting said gas mixture to contact with at least 5 mols of benzene per mol of olefin in said mixture, at a temperature of 100 to 300° F. and a pressure of 200 to 600 pounds per square inch, said temperature and pressure being such that substantially all of the propane and propylene are absorbed and only partial absorption of methane, ethane, and ethylene is effected, separating the resulting solution from unabsorbed hydrocarbons of said cracked petroleum gas fraction, subjecting the resulting solution to contact with a kieselguhr-phosphoric acid catalyst at a temperature of 450 to 475° F., and separating from the resulting alkylate a solution comprising essentially cumene.

5. In the manufacture of an alkylated aromatic hydrocarbon from a normally liquid aromatic hydrocarbon and a mixed hydrocarbon fraction containing normally gaseous olefins and paraffins of different numbers of carbon atoms per molecule, the method which comprises first contacting the normally liquid aromatic hydrocarbon as substantially the sole absorption medium with the mixed hydrocarbon fraction in an absorption zone under conditions to selectively absorb a normally gaseous olefin and corresponding paraffin of a higher number of carbon atoms per molecule, separating the aromatic hydrocarbon containing absorbed olefin and paraffin from the remaining unabsorbed hydrocarbon fraction containing the major proportion of a normally gaseous olefin and corresponding paraffin of a lesser number of carbon atoms per molecule present in the original mixed hydrocarbon fraction, and then subjecting the separated aromatic hydrocarbon with absorbed olefin and paraffin to contact in an alkylation zone with an alkylation catalyst under conditions to effect alkylation of the aromatic with the absorbed olefin and produce primarily a selected alkylated aromatic hydrocarbon.

6. The method according to claim 5, wherein the mixed hydrocarbon fraction is a $C_2$—$C_3$ fraction.

7. In the manufacture of cumene, the method which comprises contacting benzene as substantially the sole absorption medium with a hydrocarbon cracking gas fraction consisting essentially of $C_2$ and $C_3$ olefins and paraffins in an absorption zone under conditions to selectively absorb propylene and propane without substantial absorption of ethylene, ethane and any lighter hydrocarbons, separating the benzene with absorbed propylene and propane from the remaining unabsorbed hydrocarbon cracking gas fraction, and then subjecting the separated benzene with absorbed propylene and propane to contact in an alkylation zone with an alkylation catalyst under conditions to produce cumene as the principal reaction of the process.

8. The method according to claim 7, wherein the resulting alkylation products are stabilized to remove propane overhead under a pressure substantially below 600 pounds per square inch such that propane vapors can be condensed with available cooling water to form reflux condensate for the stabilizing operation.

9. The method according to claim 7, wherein the resulting alkylation products are first stabilized to remove propane, then debenzenized to remove benzene which is recycled to the absorption zone, and finally fractionated to separate cumene from any lighter and heavier alkylated benzenes.

10. In a process of producing cumene by reacting benzene with propylene, the improvement which comprises contacting a gaseous fraction containing propylene and a substantial amount of a lower boiling hydrocarbon with an amount of benzene in the liquid phase in substantial molecular excess of the propylene present under conditions at which propylene is absorbed by the benzene without substantial absorption of lower boiling hydrocarbons, and reacting the resulting absorption product under alkylation conditions.

11. In a process of producing an isopropylated aromatic hydrocarbon of the benzene series by reacting a liquid aromatic hydrocarbon of the benzene series with propylene, the improvement which comprises contacting a gaseous fraction containing propylene and a substantial amount of a lower boiling hydrocarbon with an amount of the said aromatic hydrocarbon in the liquid phase in substantial molecular excess of the propylene present under conditions at which a high proportion of the propylene of said gaseous fraction is absorbed by the aromatic hydrocarbon with not more than partial and minor absorption of lower boiling hydrocarbons, and reacting the resulting absorption product under alkylation conditions.

12. In a process of producing cumene by reacting benzene with propylene, the improvement which comprises contacting a gaseous fraction containing substantial amounts of propylene, propane, ethylene and ethane with an amount of benzene in the liquid phase equivalent to at least three mols of benzene per mol of propylene present under conditions at which a high proportion of the propylene of said gaseous fraction together with propane are absorbed by the benzene with not more than partial and minor absorption of the ethylene and ethane, and reacting the resulting absorption product under alkylating conditions.

JAMES A. DAVIES.

REFERENCES CITED

The following references are of record in the file of this patent:

UNITED STATES PATENTS

| Number | Name | Date |
|---|---|---|
| 1,915,781 | Halloran et al. | June 27, 1933 |
| 2,205,996 | Van Wijk | June 25, 1940 |
| 2,246,592 | Huff | June 24, 1941 |
| 2,290,211 | Schaad | July 21, 1942 |

FOREIGN PATENTS

| Number | Country | Date |
|---|---|---|
| 464,752 | Great Britain | Apr. 19, 1937 |

OTHER REFERENCES

Kalichevsky, "Modern Methods of Refining Lubricating Oils," published Reinhold Pub. Corp., N. Y. (1938), page 116 (1 page).

"Ethyl Benzene . . . Outlet," Oil and Gas Journal, Aug. 6, 1942, pages 14–15 (2 pages). (Photostat in Div. 31.)